United States Patent
Bonon et al.

[19]

[11] Patent Number: 6,036,591
[45] Date of Patent: Mar. 14, 2000

[54] TENDERIZING PROCESS FOR PIECES OF MEAT, MECHANICAL EQUIPMENT FOR THE IMPLEMENTATION OF THE PROCESS

[75] Inventors: Lino Bonon, Dossobuono VR; Giampietro Righele, Zane VI, both of Italy

[73] Assignees: RB Engineering S.r.l., Zane VI; Lino Bonon, Dossobuono VR, both of Italy

[21] Appl. No.: 09/222,998

[22] Filed: Dec. 30, 1998

[30] Foreign Application Priority Data

Jan. 8, 1998 [IT] Italy ................................ RM98A0005

[51] Int. Cl.[7] .................................................. A22C 9/00
[52] U.S. Cl. ............................................................ 452/142
[58] Field of Search ..................................... 452/142, 141

[56] References Cited

U.S. PATENT DOCUMENTS

| | | | |
|---|---|---|---|
| 252,743 | 1/1882 | Davis | 452/142 |
| 311,199 | 1/1885 | Moulton | 452/142 |
| 3,716,893 | 2/1973 | Vogelsang | 452/142 |
| 4,437,208 | 3/1984 | Sampson | 452/142 |
| 5,850,786 | 12/1998 | Bifulco | 452/142 |

FOREIGN PATENT DOCUMENTS 2818710  11/1979  Germany ................ 452/142

*Primary Examiner*—Willis Little
*Attorney, Agent, or Firm*—Browdy and Neimark

[57] ABSTRACT

The present invention relates to a process as well as to the related equipment for the production of strips, or of substantially thin pieces of tenderized meat, which are intended as ingredients for high-tenderness meat products in order to form a basic attribute of acceptability for the consumer, particularly because of the high sensorial quality perceived by the same consumer in chewing. Said process consists in subjecting the pieces of meat—advantageously cut in a preparatory device—to the pressing and tightening action of a tenderizing mechanical equipment, which changes their shape by submitting them to flattening sliding motions in several directions, in order to obtain a geometric shape like thin sheets of meat of complete tenderness and friability with both a higher nutritive quality and market value.

18 Claims, 10 Drawing Sheets

TENDERIZING PROCESS FOR PIECES OF MEAT, MECHANICAL EQUIPMENT FOR THE IMPLEMENTATION OF THE PROCESS

DESCRIPTION

The present invention relates to a tenderizing process for fresh meat from different animal species including fish, advantageously for raw meat cut into pieces of previously arranged, substantially flat shapes, and particularly for pieces of raw meat from animals of evident fibrousness—due to hard and stringy muscle structures—classified as of poor quality because of their toughness and poor digestibility as foodstuff. More precisely, the present invention relates, as well, to a mechanical equipment apt for the production of the flattened, thin piece of completely tenderized raw meat produced according to said process.

It is known that processing intended to render the meats more tender, digestible and tastier has been widely implemented for a long time in the fresh meat industry, where meat is obtained by slaughtering the animals intended for the production of meat food products of high nutritive quality, because they allow a faster restoration of the nitrogen compounds used up by the body for its vital functions and during growth. Meat approved for consumption is not always first quality with regard to softness, tenderness and friability. Most alimentary meat cuts, obtained from the slaughtering of several animal species are of poor nutritive quality and low market value because their connective and muscular tissue is tough and fibrous, and therefore hard for the consumer to digest due to chewing problems.

Nowadays the demand expressing the needs of the different consumer communities, or the different industrial approaches to the production of meat food products require a great selection of high-quality meat products, a good sensorial quality during chewing of the same products and, last but not least, a reasonable price.

Therefore, the fresh meat industry and markets are generating an intrinsic spontaneous question "How can we bring together a large supply of tender and friable meat of high nutritive quality and low price?"

In order to produce a large supply of high-quality, low-price meat, transformations are required to produce a tenderization on portions of fresh meat which are tough and fibrous in their connective and muscular tissue. The meat food product industry has since long caught on this need for such a transformation, and has therefore stimulated various modes of implementation of the tenderizing process for stringy meat portions.

According to a method for the improvement of meat tenderness that has been commonly applied for a long time, the meat is stored up after slaughtering the animals in order to start the aging process, which activates enzymatic and physical-chemical processes which synergically cause a partial, mild tenderization of the meat. In fact, it seems that in order to explain most of the changes at a structural level it is necessary to take into consideration the synergic action of both processes, as each of them, if taken separately, is not able to reproduce all the changes. The results obtained up to now are contradictory, and, time and quantity of fresh meat being equal, the result is not always the same. Effects of age and sex are also related to the muscle effect: metabolism becomes more oxidative with age, and the speed of contraction of the whole muscular system as well as the speed of tenderization decrease. At the same time, collagen fibers become more thermostable, so that basic toughness increases. Incidentally, meat shows different aging speeds depending on the animal species from which said meat is obtained. However the aging time to obtain an appreciable result—which is not certain anyway—as regards tenderness, is a long one for any kind of meat, with the risk of obtaining meat affected by processes that make it unpleasant to sight, smell or taste, even if not directly detrimental to the consumer. Moreover, the processes and the related equipments for the tenderization of fresh meat proposed by the standard implementation of the know-how related to the prior art, comprise processes of delayed refrigeration and of electric stimulation of the carcasses of the slaughtered animals. Thus, the addition of tenderizing enzymes, frequently of vegetable origin, injected intravenously about thirty minutes before slaughtering, is known as well. Dipping the carcasses of the slaughtered animals in solutions containing calcium ions ($Ca_2^+$) was also suggested. The results of the industrial applications illustrated above are not always effective in improving the final tenderness of the fresh meat and said applications are facing difficulties on the part of the operators for the set-up of their practical aspects, and moreover, the effects on the other quality characteristics often produce detrimental results because there are more or less noteworthy alterations in the meat that damage both its nutritive quality and its market value. Finally, said prior art processes result in a low yield as the tenderization is not uniform and does not reach every section of the carcass of the slaughtered animal; at the same time considerably long storage times are required in order to find real structural changes which cause an actual reduction in the toughness of the fresh meat, resulting in preservative storages of high operative cost, increased by the extra costs deriving from the considerable amount of idle money. Moreover, a brief pressing of the muscular raw meat portions by a pressure strong enough to result in a considerable reduction in the toughness of the same meat is also known to men skilled in the art. Tenderizing equipment is known from the European patent publications EP 641518 and EP 761099 which repeatedly compresses by means of pressing actions the piece of raw meat, prepared in advance, to be tenderized. Such equipment presents, however, several drawbacks, which make its implementation limited and unsatisfactory. Such drawbacks consist particularly in the lack of universal operativeness on all types of meat and on the various portions of meat. The presence is known of several portions of residual raw meat, i.e. all the tough and fibrous portions of meat which are usually classified in the category of meat portions intended for boiling or grinding in extremely small pieces, which remain after cutting the higher-quality portions off the carcasses of the slaughtered animals.

As regards said residual pieces of variously shaped meat, the equipment in said publications is not apt to improve them into tender and friable pieces of meat, giving them both a higher nutritive quality and market value. Moreover, said equipment presents the drawback of causing destructive lacerations, because the mechanical stress to which it subjects the meat is particularly great in the pressing direction, and such as to cause the breakdown of the muscular masses, with possible detachment of meat and damages which are detrimental to the quality of the product. Moreover, said equipment already makes use of pieces from cuts of good-quality raw meat, operating only to further improve their tenderness so that tough, fibrous and tendinous portions obtained from the low-quality cuts of the slaughtered animals' carcasses are not used to their best by said equipment. There follows that it is not apt to form a universal industrial apparatus for the tenderization of raw meat, especially fresh raw meat of low nutritive quality and market value.

It is clear from the above that the processes and the equipment used in the meat-tenderizing sector require extensive manual operation performed by skilled labor, moreover these tasks cannot be assigned in advance and therefore inherent cost is high; furthermore, we are in the presence of an inadequate compromise between productivity and tenderizing quality of the product: the latter aspect is the main aim of every production process.

The applicants, therefore, have considered the problem in its entirety with the definite aim of devising a process and a mechanical equipment apt to comprise such functional and structural characteristics as to overcome the drawbacks mentioned with reference to the prior art. The concept behind the solution which underlies the present invention is to set up a process for obtaining substantially thin sheets of perfectly tenderized raw meat, according to which process the conditions which cause the even minimal lacerations in the thinned meat are eliminated. In fact, the advantage of the process and of the equipment proposed herein, by means of an original solution, is that they make considerable economic benefits possible for the manufacturer and guarantee the supply of high sensorial-quality products for the consumer.

An object of the present invention is therefore to guarantee a process apt to:

reduce the incidence of manual labor and, therefore, reduce the cost of fresh meat as tender and digestible foodstuff;

optimize the utilization of the whole carcasses of the various species of slaughtered animals;

increase the production of tender, tasty, easily digestible meat;

achieve a substantial technological modernization in the tenderization of portions of meat having no high-quality characteristics, and, therefore, presenting marketing problems.

Another object of the present invention is to devise an automatic equipment easy to build and extremely reliable and strong which will produce faultless results.

A further object of the present invention is to automatically adjust the equipment to any change in the thickness of the substantially thin sheets of tenderized raw meat and, therefore, to completely eliminate the need for operators attending on the same equipment, which presents itself as operating wholly mechanically with a tenderizing operative cycle advantageously continuous, not needing any downtime and any positioning of the pieces of raw meat between the inlet and the outlet of the same equipment.

A further object, just as important as the objects illustrated above, is that the equipment operates with very low power consumption.

The task underlying the invention consists, therefore, in indicating a process and in constructing a mechanical equipment thanks to which the drawbacks and the disadvantages connected with the arrangements currently proposed by the art and previously illustrated are eliminated altogether. Achievement of said and further objects is moreover guaranteed, and accordingly the present invention relates to a tenderizing process for fresh meat from the different animal species including fish, advantageously for animal meat cut into pieces of previously arranged flat shape, and particularly for portions of meat of evident hardness and toughness due to tough and stringy muscular structures, and said process comprises in sequence the following operative steps:

placing said pieces of meat under the pressing action of contrarotating rollers provided with opposed no-contact intermeshing tooth-like projections in order to produce at the inlet a holding pliers-like action with no backup, followed by progressive pressing and stretching actions overlapping in time, along an operative gap of continuously changing width, but having at least one section where the gap presents a preset, substantially constant value;

pressing and tightening in overlapping steps along several transversal, axial and oblique directions, the pieces of meat which are subjected, by means of the shape and orientation of the tooth-like projections of the toothed rollers, to localized and subsequent stretching actions with continuous and progressive thinning effects in order to obtain at the outlet of the toothed gap and, therefore, at the end of the action of the teeth, geometric shapes like thin sheets of firm flattened meat which are tenderized in their structure by sliding motions and detachment of the fibers without their disruption, with evident characteristics of both higher nutritive quality and market value.

Said toothing of the rollers operates by means of shapes and dimensions apt to obtain a dragging and stretching gap as uniform as possible and having a greater linear development and operative pliers-like holding, pressing and tightening surfaces provided with a corrugation of preset value, which is a function of the type of meat being processed, as well as of the required degree of tenderness.

The operative tenderizing gap between the interacting intermeshing teeth has a width that is adjustable in its minimum value as a function of the type and of the degree of tenderization of the meant being processed, and said minimum width varies substantially in the value range between 0.5 and 10 millimeters.

According to an embodiment the process allows the simultaneous stretching along several directions of the piece of meat being processed, tightening and pressing it by means of tooth like projections slanting as compared to the longitudinal generating lines of the interacting, intermeshing toothed rollers.

According to a further embodiment, the process carries out the tenderization by means of tooth-like projections tilting alternatively in both directions, right and left, and alternatively approached with opposed inclinations, one after the other, in order to make up the opposed, interacting rollers in the same way of multiple, pack-assembled gear disks with connecting joints, or cusp-like arrangements, between one gear disk and the following one with different tilting.

According to a further embodiment the process carries out the tenderization by means of circular tooth-like projections which intermesh and interact without contact, in order to generate an undulated gap for rolling the pieces of raw meat between the facing contrarotating rollers.

According to a further embodiment, the process carries out the tenderization in several progressive and subsequent steps by means of at least two pairs of facing gear rollers, one after the other, with identical—or different by size and/or geometric shapes—tooth-like projections of the pairs of rollers, and substantially equal or advantageously different operative gaps.

According to a further embodiment, the process carries out the tenderization in several progressive and subsequent steps by means of at least three facing gear rollers, interacting and intermeshing without contact in order to operate with gaps substantially different in width and advantageously progressively narrowing as compared to the inlet conveyance of the pieces of meat to be tenderized.

The mechanical equipment for the practical implementation of the process, object of the present invention comprises:

at least one preparatory unit, preferably a rotary cutter for cutting meat blocks, or whatever piece of meat to be tenderized, in slices;

belt, or like-elements, conveyors for conveying the pieces of meat advantageously prepared to the tenderizing unit;

at least one tenderizing unit comprising at least two facing contrarotating rollers provided with interacting and intermeshing tooth-like projections so as to subject the pieces of meat placed between them to dragging, pressing and stretching actions in several directions, which will cause the sliding motions and the detachment of the muscular and connective fibers, but not their disruption, and said tooth-like projections preferably present both a high ratio between their height and their pitch, and an outline of the sinusoidal type advantageously adjusted in order to make the width of the passage gap as uniform as possible along the area of interaction of the rollers, which should preferably present high values in their pitch diameter;

an adjusting device for the interaxial distance of the contrarotating rollers in order to allow the intermeshing of the facing teeth, and the forming between them of an operative gap whose minimum width is adjustable in the range of values oscillating substantially between 0.5 millimeters (five tenths of a millimeter) and ten millimeters, and said adjusting device is a kinematic mechanism preferably comprising a bearing shaft provided with eccentric static seats of bearing, or like kinematic mechanisms, which advantageously generate a motion parallel to the axis of one of the two rollers with respect to the other by using a lever, or a regulating wheel, which can easily allow a precise and micrometric adjustment of the width of the gap between the opposed and interacting teeth of the rollers;

a kinematic mechanism for operating in contrarotation the facing interacting toothed rollers which intermesh without contact, and said kinematic mechanism is preferably a gear or chain transmission, or a transmission operating by means of known homokinetic joints, which allow a perfect synchronization between the toothed rollers;

cleaning elements for the tenderizing rollers, placed right below the operative area of the soothed rollers, in order to remove from the surface of the toothed outlines the residual meat material which may accidentally stick to them by adhesion, and said cleaning elements are preferably scraping blades, advantageously made of plastic and presenting a sharp edge, which are kept in contact with the rollers by means of an elastic force generated by springs with a contact pre-charge;

a belt device, with a wheeled container for collecting the thinned, tenderized pieces of meat.

According to an embodiment the mechanical equipment of the present invention takes the shape of a tenderizing unit comprising contrarotating rollers provided with tilted teeth with a right or a left-helix as compared to the generating lines of the rollers.

According to a further embodiment, the mechanical equipment of the present invention takes the shape of a tenderizing unit comprising contrarotating rollers formed by several alternating sections of tilted teeth with a right or a left helix, with circumference lines of joints advantageously connected substantially by circular arcs, or cusps, for the continuuity of the subsequent sections of different tilting.

According to a further embodiment, the mechanical equipment of the present invention takes as well the shape of a tenderizing unit comprising contrarotating rollers provided with teeth, or circular undulated grooves orthogonal to the axis of the rollers, or substantially tilted with a left helix, or with a right helix as compared to the circumference line.

According to a further embodiment, the mechanical equipment of the present invention takes also the shape of a tenderizing unit comprising gear rollers shaped substantially like a truncated cone.

The present invention includes also the piece of tenderized raw meat, in particular a thin flattened piece of raw meat completely compressed by means of thinning sliding motions in several directions and micrometrically stretched with detachment without disruption of the fibers of the connective and muscular tissue, produced by the process and the mechanical equipment illustrated above.

The present invention will be hereinafter disclosed in detail by the embodiment example schematically illustrated in the drawings of the annexed sheets, which shows in brief the characteristics of the invention, it being to be noted that all the annexed drawings, as well as the description of the same that will be provided hereinafter, correspond to a preferred embodiment in order to make its mode of implementation better understood, however the possible variations in the reciprocal positions of its elements must be intended as falling within the protective scope which is being requested, as well as, also, the resulting simplifications which could derive from them and all the construction variations included in the general concept, which is illustrated with reference to the annexed drawings wherein:

FIG. 1 is a schematic side elevational view of the mechanical equipment of the present invention which shows a tenderizing unit comprising two contrarotating facing rollers, and includes the scraping-blade cleaning elements and a lower collection wheeled container, said view schematically showing, as well, the belt conveyors for forwarding the blocks of meat to the inlet of the preparatory unit for the pieces of meat to be tenderized, and from the preparatory unit to said tenderizing unit;

Figure 9:
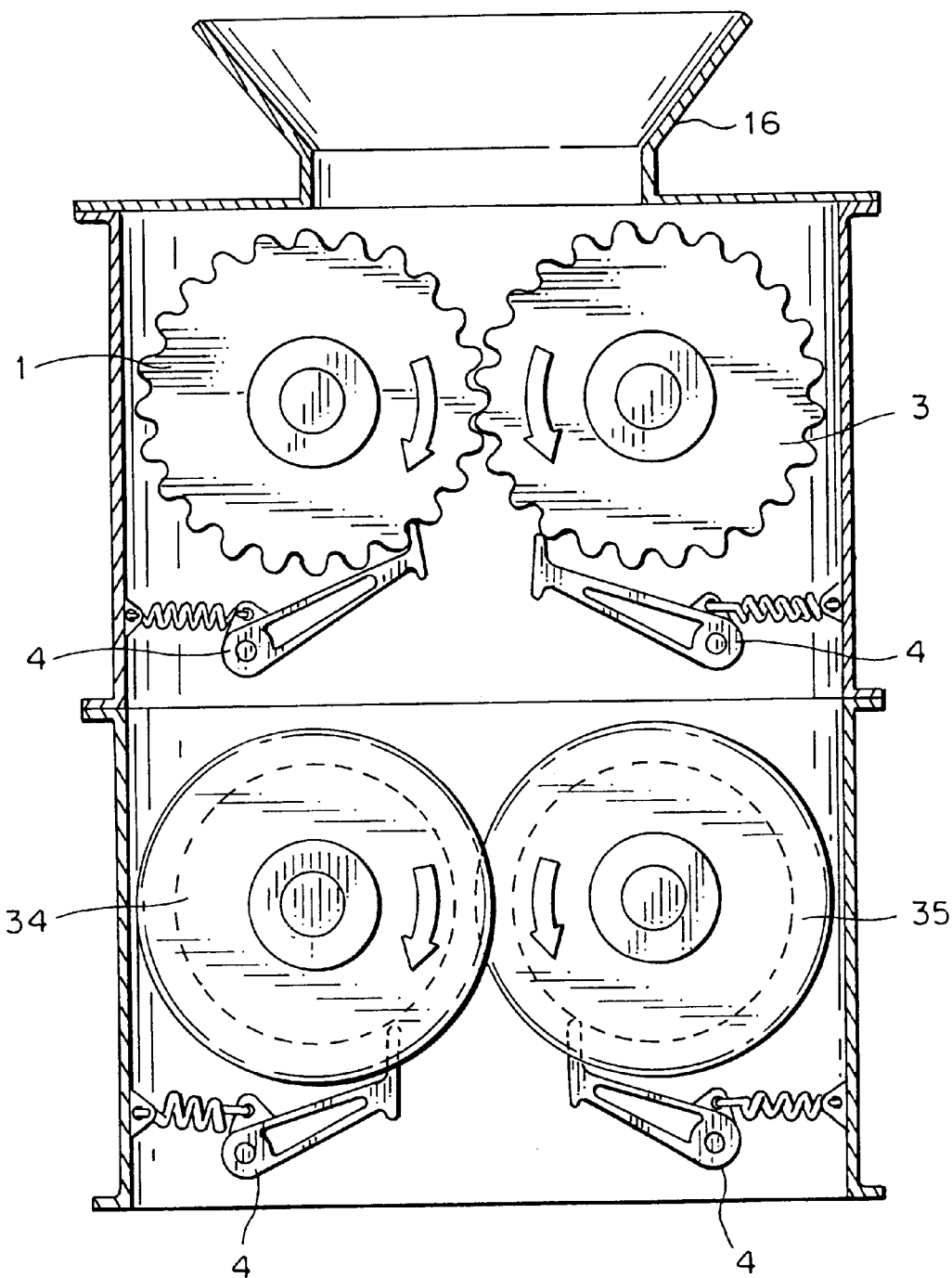
Figure 10:
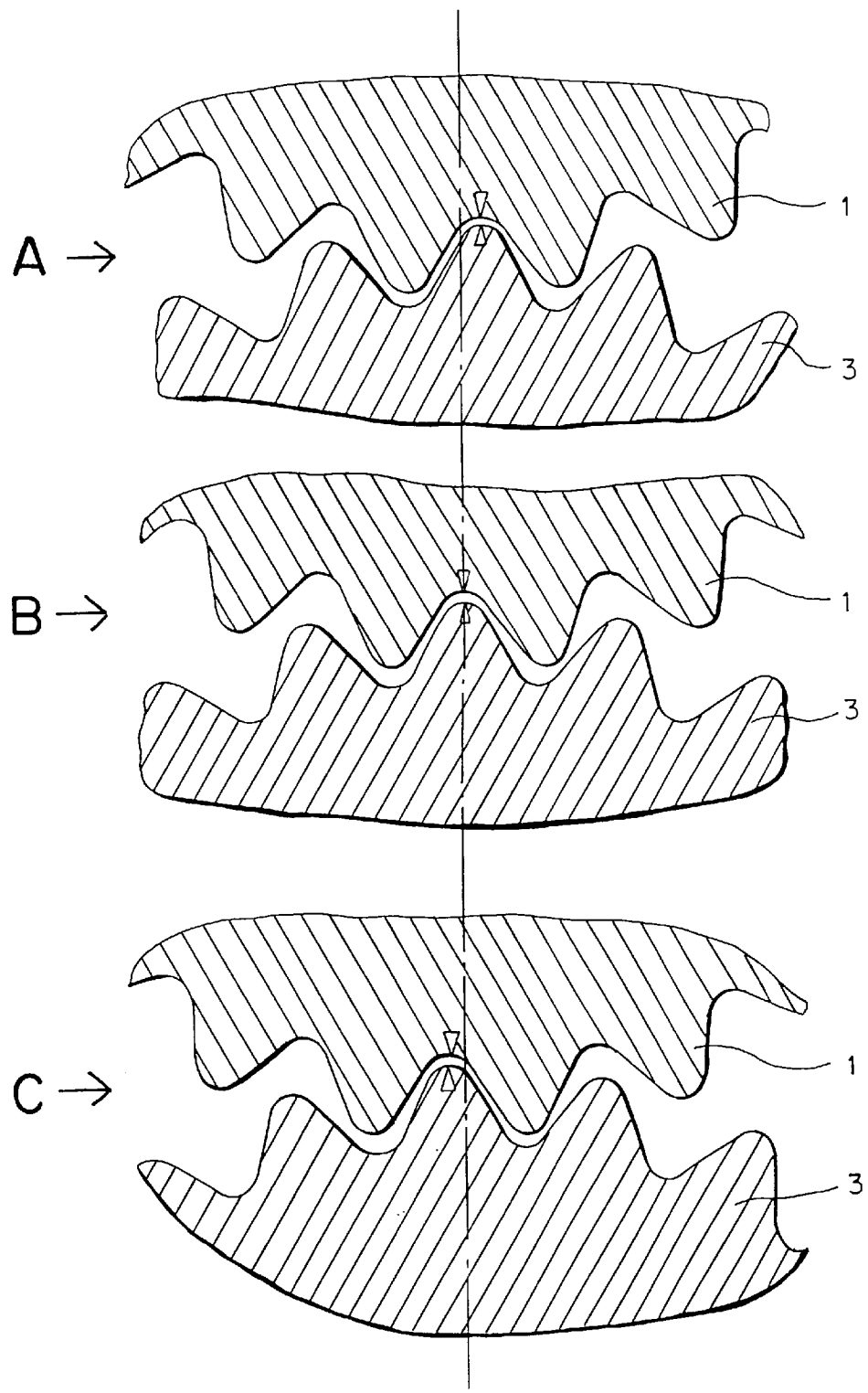

FIG. 9 is a schematic front elevational view which shows two tenderizing units, one above the other, to carry out the tenderization in two progressive and subsequent steps; and FIG. 10 is a schematic view which shows in section the consecutive instants A,B and C, of the intermeshing of the opposed tooth-like projections of the contrarotating facing rollers, said view showing, as well, the subsequent operative gaps generated by the outline of the teeth, preferably of the sinusoidal type, and with operative tenderizing areas whose corrugation value is pre-set in accordance with the kind of meat being processed.

In the figures corresponding parts, or parts carrying out the same function, are indicated by identical reference characters for the sake of simplicity.

Moreover, for the sake of clarity as regards the equipment as a whole, the devices and the mechanisms operating in reciprocal cooperation with the mechanical equipment itself are not shown in the figures and, therefore, their operating modes are not illustrated hereinafter because they are already known, and also because they are not necessary to understand the operating modes of the present invention. Thus, for example, the loading mechanism which feeds the pieces or blocks of meat to be tenderized, which are placed in collection containers or on belt, or like elements, conveyors, is not shown and the discharge mechanism for the tenderized product is not shown as well. Thus, also, the motors operating the belt conveyor and the preparatory unit for the pieces to be tenderized are not shown, and thus, also, as a consequence, the details of the circuitry of such automatic system are neither shown nor described, as the latter can be carried out in a different manner, all of them relating to the prior art.

Figure 1:
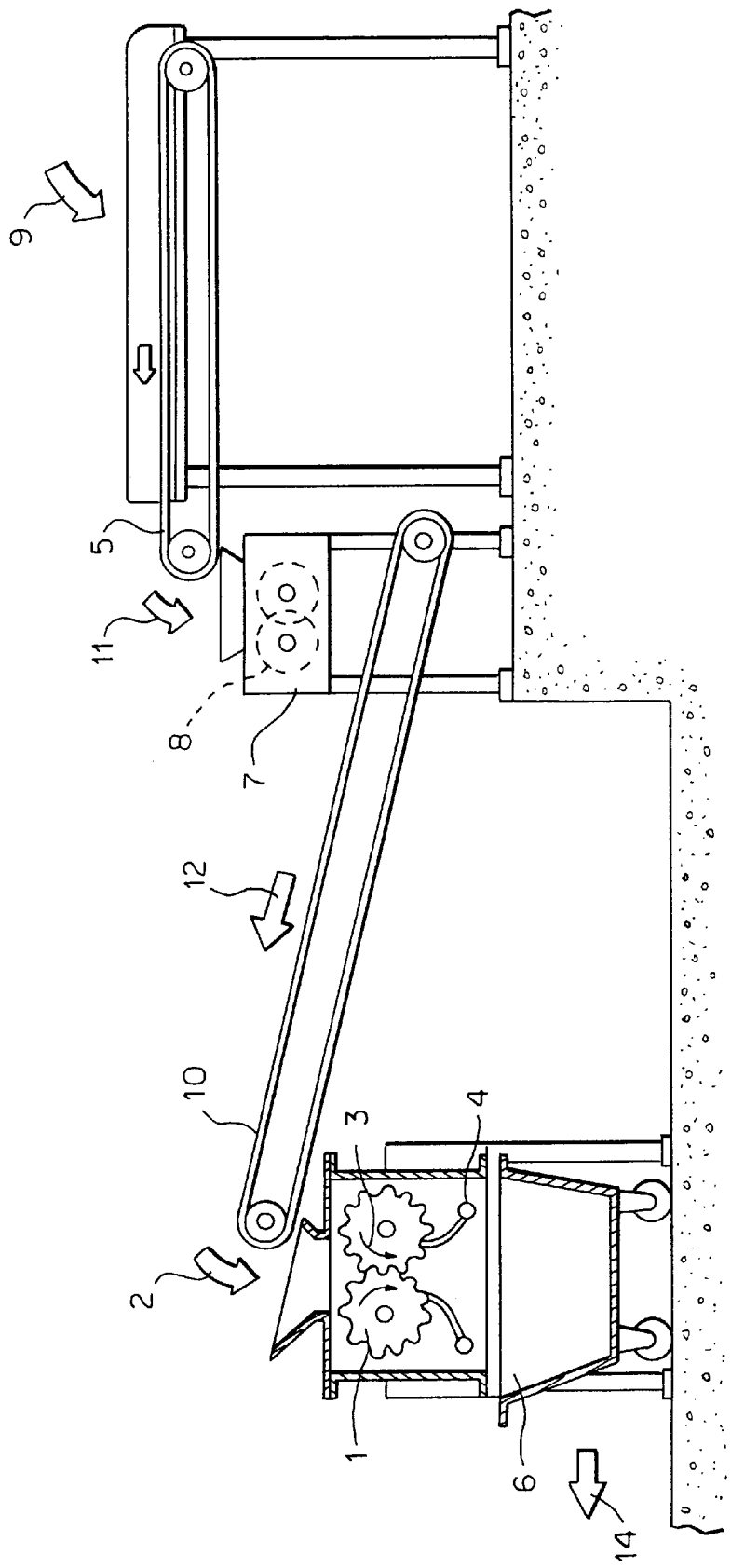
Figure 2:
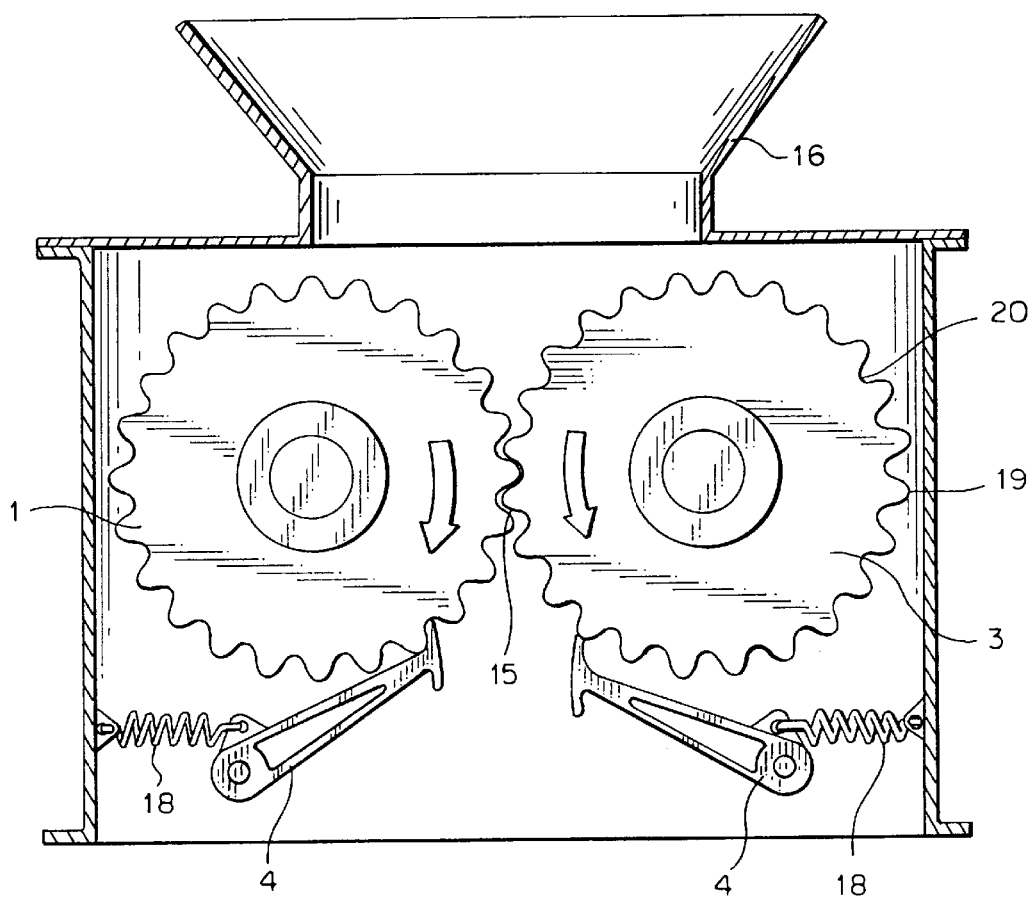
FIG. 2 is a schematic side view which shows the tenderizing unit, with contrarotating rollers presenting an operative gap between their tooth-like projections, said view showing, also, in schematic section, the feeding hopper connected to the covering casing which functions as a hook-up and support for the scraping blades' spring leverage.
Figure 3:
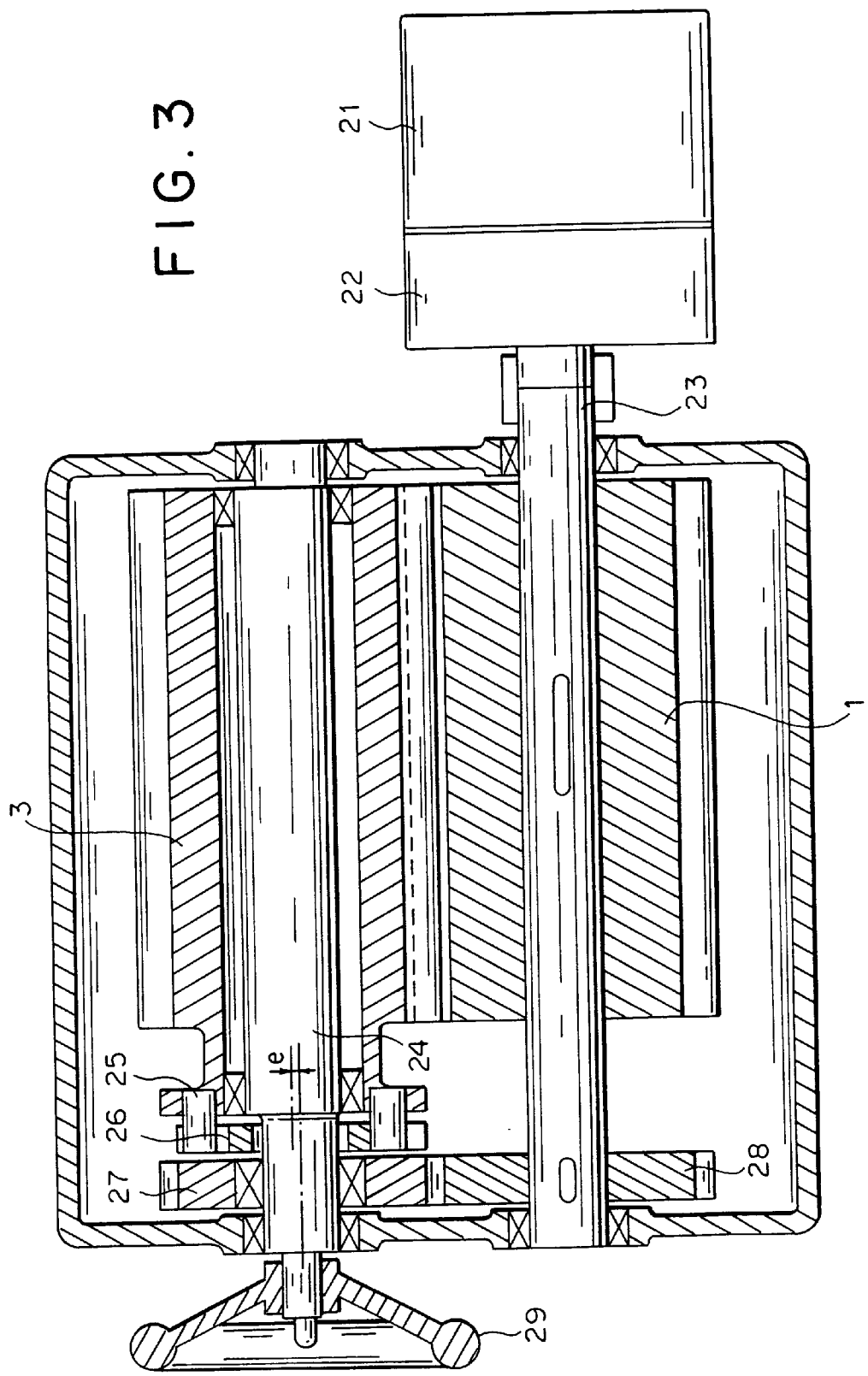
FIG. 3 is a sectional view which shows the tenderizing unit in association with both the adjusting device for the interaxial distance of the contrarotating rollers, intended for changing the width of the operative gap, and the kinematic mechanism which operates the rollers in contrarotation, said view schematically showing as well the drive-reduction unit.
Figure 4:
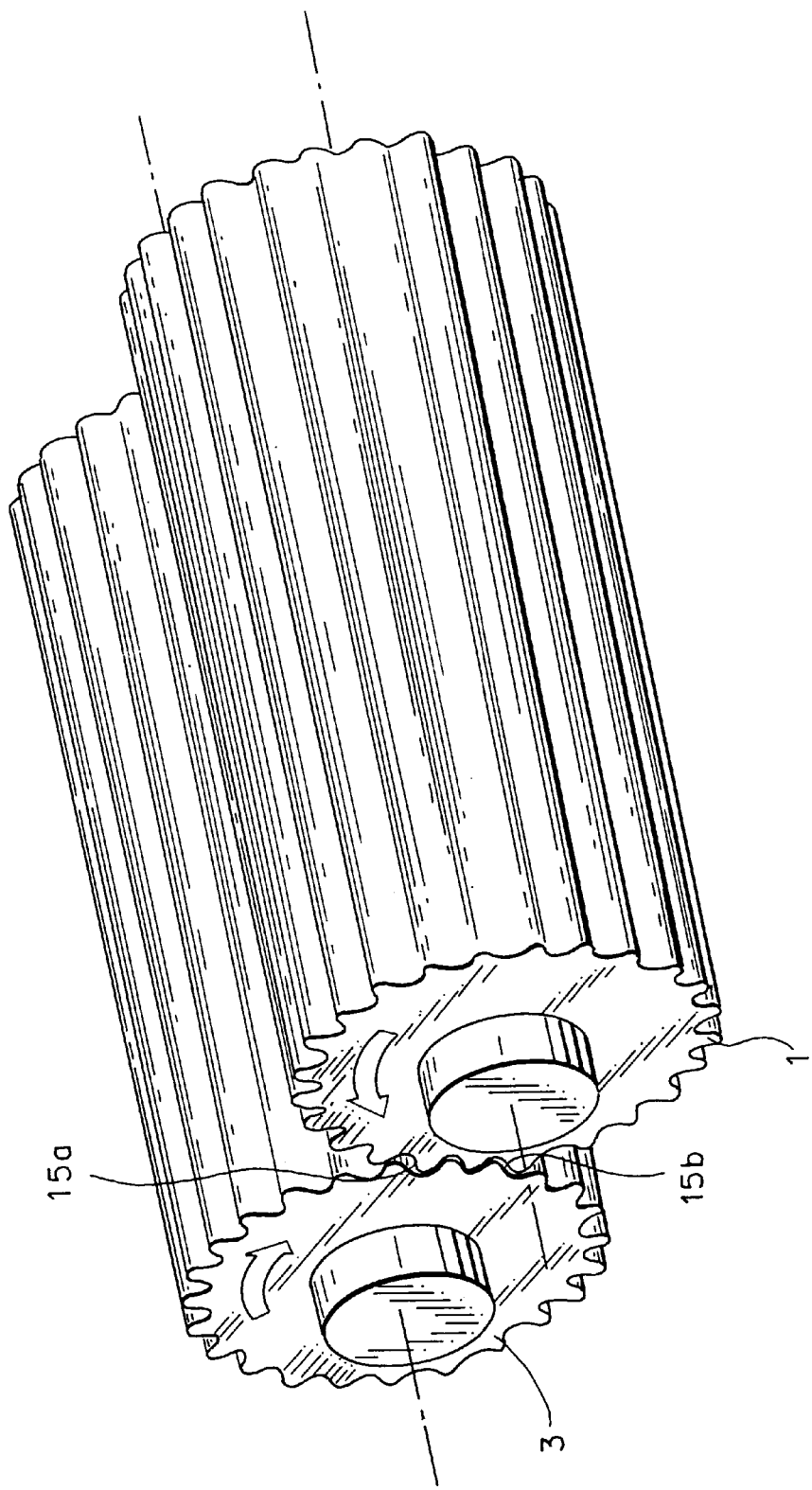
FIG. 4 is a schematic view in axonometric perspective which shows the contrarotating rollers provided with opposed tooth-like projections which intermesh without contact and with an orientation substantially parallel to the longitudinal generating lines of the rollers.
Figure 5:
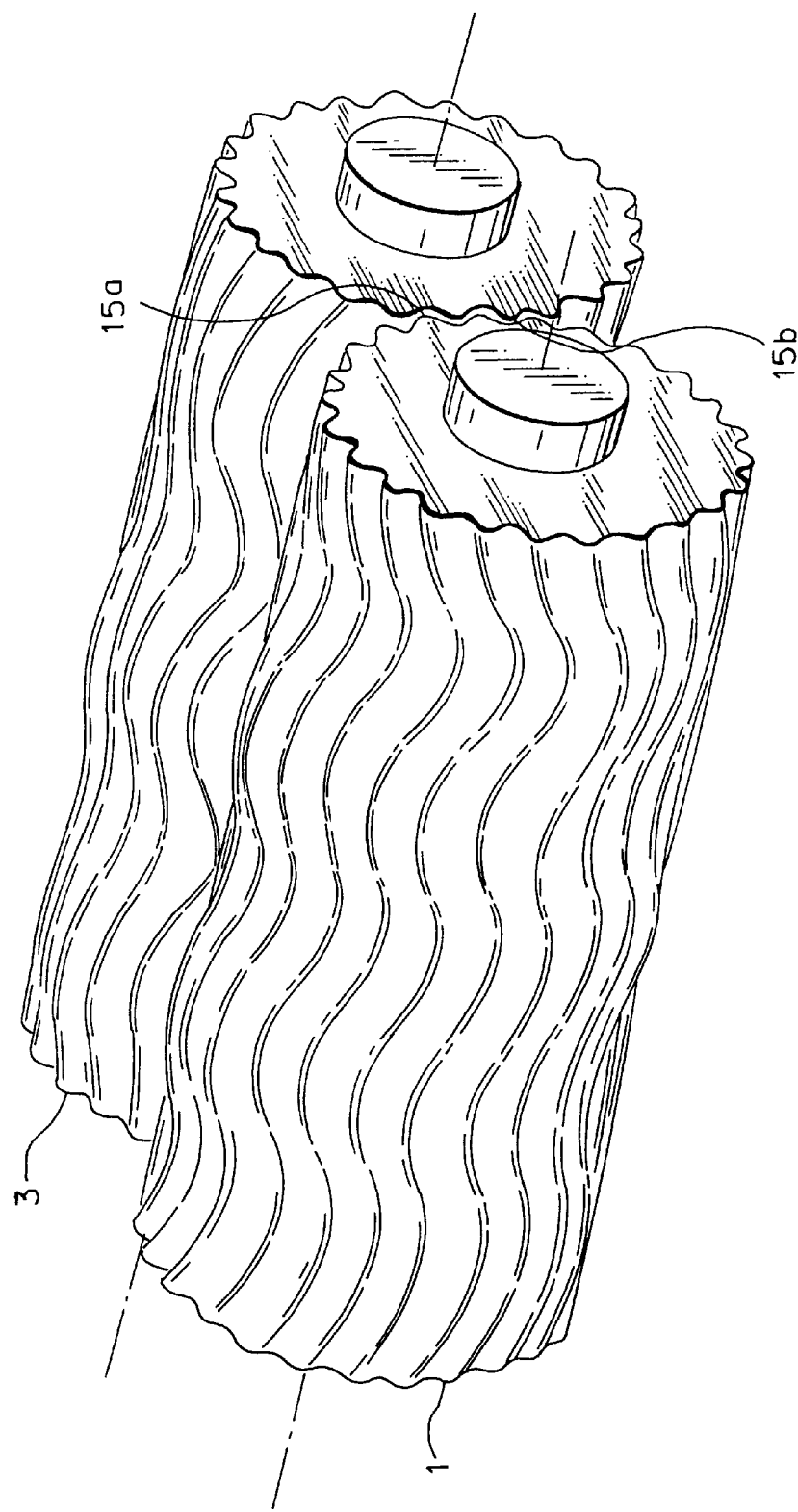
FIG. 5 is a schematic view in axonometric perspective which shows the contrarotating rollers provided with opposed tooth-like projections which intermesh without contact and with a tilted orientation, preferably undulated along various axial sections as compared to the longitudinal generating lines of the rollers.
Figure 6:
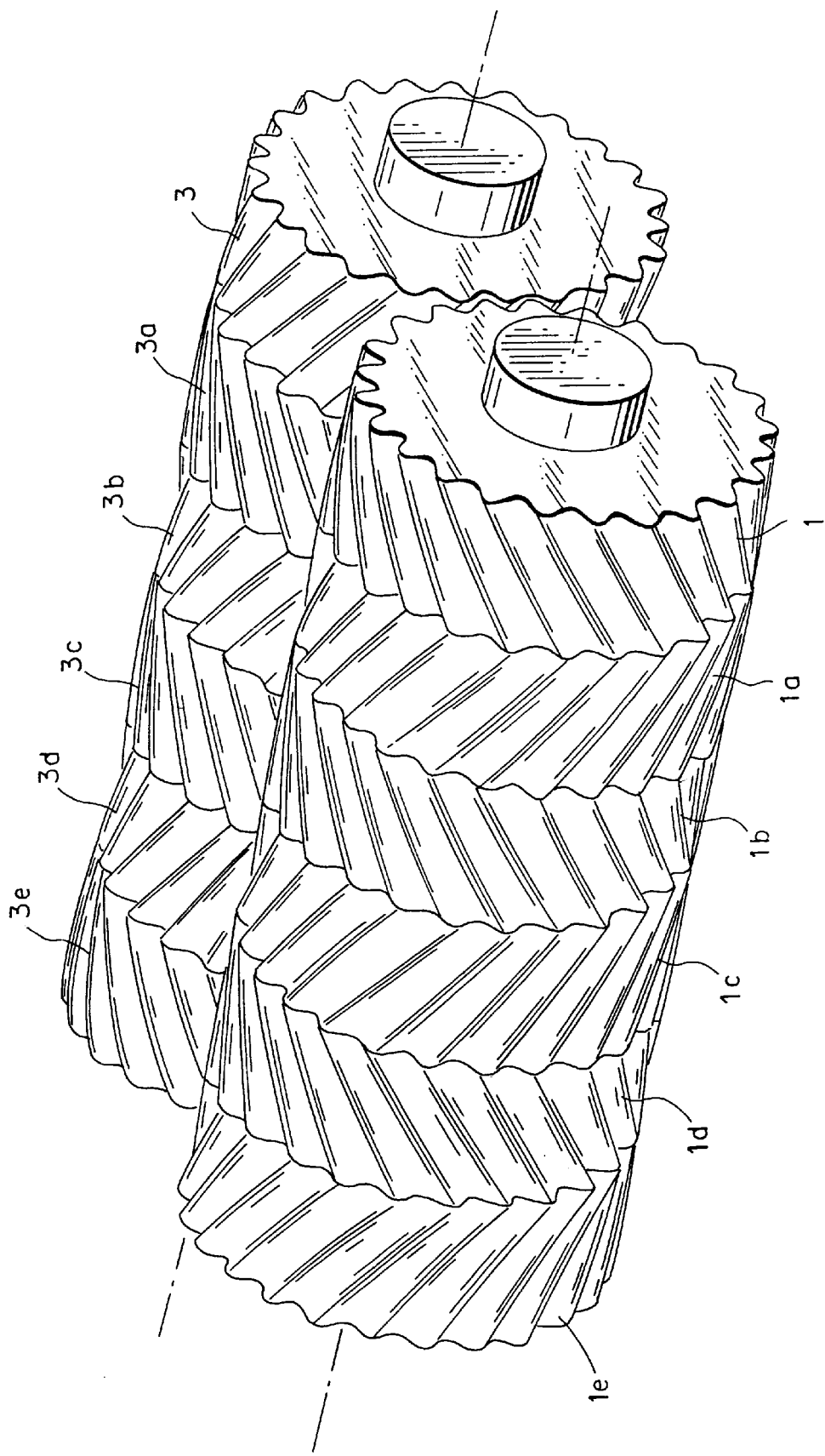
FIG. 6 is a schematic view in axonometric perspective which shows the contrarotating rollers provided with opposed tooth-like projections tilting alternatively in the two directions, right and left, and alternatively approaching with opposed tilting in order to form a pack-assembly with cusp-like joints between one toothing disk and the following one, tilting in a different, opposed direction.
Figure 7:
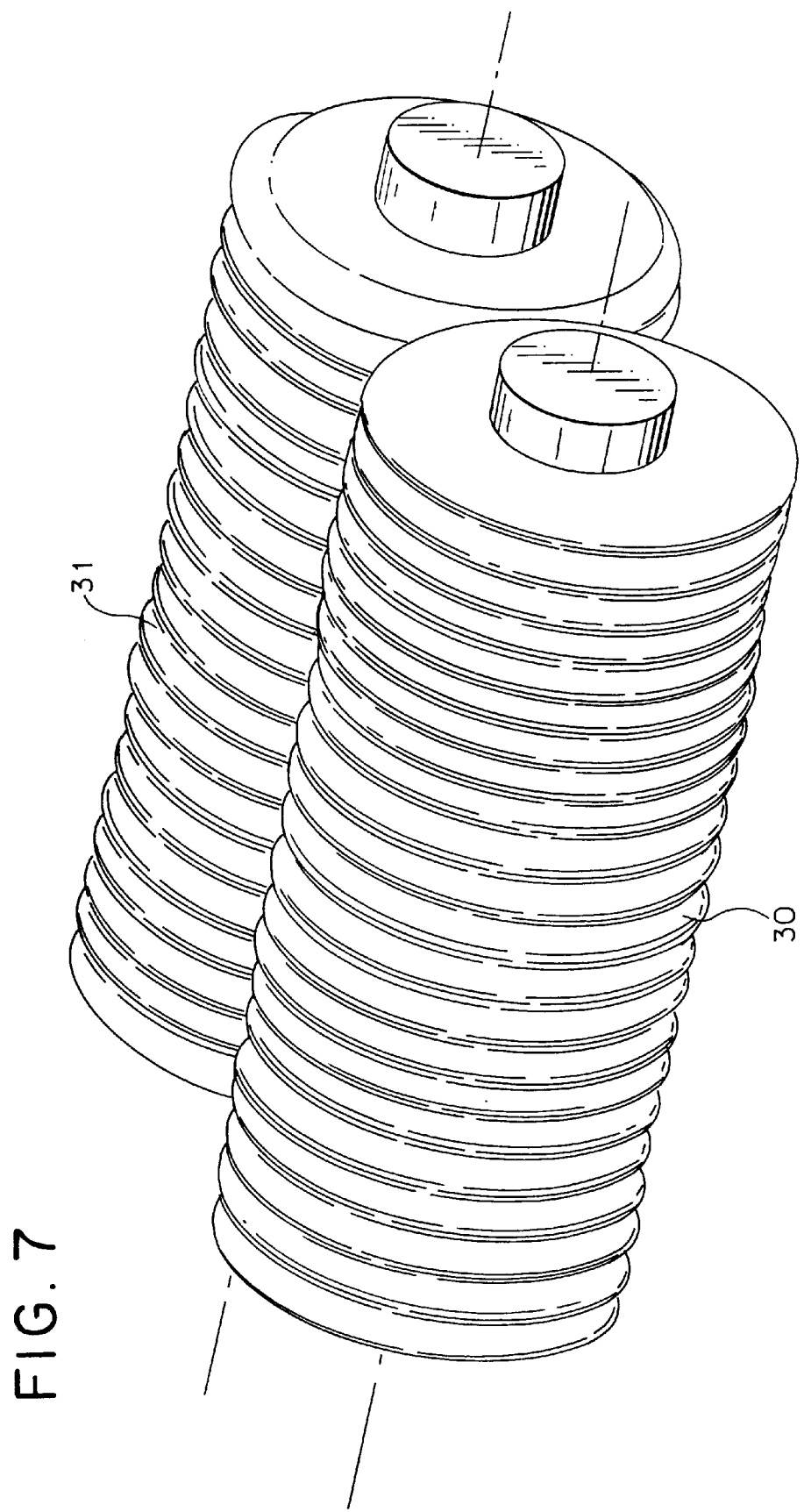
FIG. 7 is a schematic view in axonometric perspective which shows the contrarotating rollers provided with opposed tooth-like projections which intermesh without contact and with a substantially circular orientation.
Figure 8:
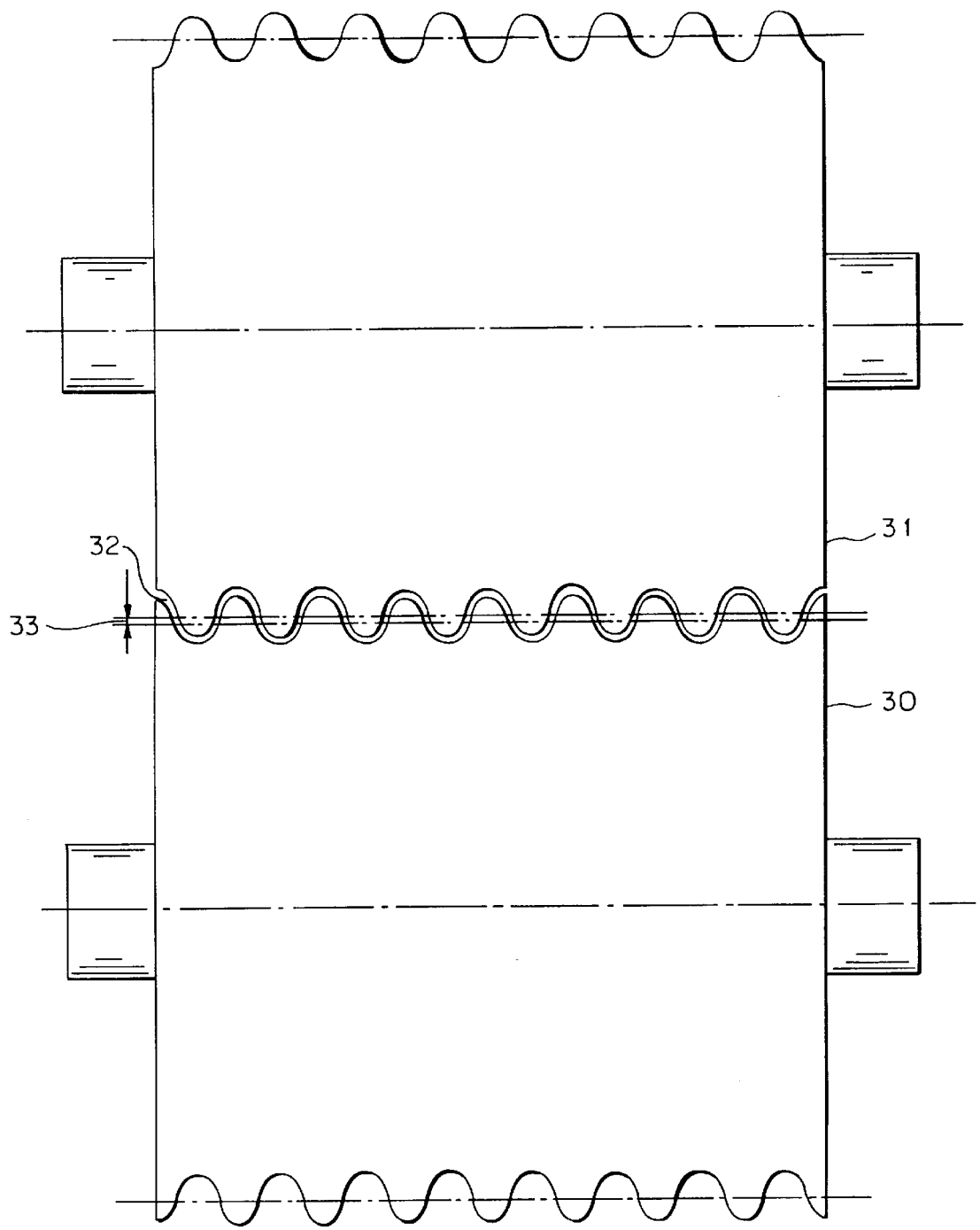
FIG. 8 is a schematic view in axial section of the contrarotating rollers of FIG. 7, said section showing an undulated operative gap between the teeth having the shape of circular intermeshing grooves.

In the annexed sheets:

1 and 3 are the facing contrarotating rollers in their correct relative position allowing their tooth-like projections to intermesh without contact so as to generate an operative gap 15 with a continuously changing width, but having at least one section, between the inlet gap 15a and the outlet gap 15b, where the width value is substantially constant and is advantageously preset by means of an device adjusting the interaxial distance of the rollers 1 and 3; 4 are the scraping blades placed right below the operative tenderizing area of the rollers 1 and 3, with the purpose of removing from the surface of the toothed outlines the meat material which may accidentally stick to them by adhesion. Said scraping blades 4 are advantageously made of plastic, suitably profiled and substantially operating by a sharp edge and kept in contact with the tooth-like projections of the rollers 1 and 3 by means of an elastic force generated by the springs 18 fastened to the frame of the casing which is connected to an above feeding hopper 16; 5 is a belt, or like element, conveyor on which the pieces of meat are placed by means of known methods and devices (not shown), in order to convey them to a preparatory unit 7 suitable for shaping the pieces of meat to be tenderized in slices or strips substantially of the same thickness. Said preparatory unit 7 can be whichever known rotary cutter provided with multiple blades 8 which can be operated by a rotary motion on a cutting plane intersecting the feeding direction of the blocks to be cut in slices as a preparatory shape for the tenderization; 6 is a wheeled container placed below the tenderizing rollers 1 and 3 for the collection and storage of the flattened pieces of meat, which result tenderized in their structure with evident characteristics of both higher nutritive quality and market value; 10 is a belt, or like element, conveyor, on which the pieces of meat at the outlet of the preparatory unit 7 are fed in order to convey them to the inlet of the feeding hopper 16; 19 and 20 are respectively the tip and the groove outline of the teeth of the tenderizing rollers 1 and 3. Said outline of the teeth is preferably of the sinusoid type, advantageously modified in order to obtained a correct intermeshing without contact between the tooth-like projections of the facing rollers 1 and 3; 21 is the drive unit connected to the reduction unit 22 in order to operate the drive shaft 23 with a number of revolutions advantageously preset by the operator; 24 is a driven shaft in the kinematic mechanism operating the toothed rollers 1 and 3 in contrarotation, by means of the gear wheels 28 and 27 for the transmission of motion. Said shaft 24 allows the adjustment of the interaxial distance of the rollers 1 and 3 by shifting its own axis in parallel to the drive axis of shaft 23, with a maximum width "e" (see FIG. 3), by means of the angular rotation of the regulating wheel 29, which operates a coupling kinematic mechanism between at least one pin 25, which is integral with the roller 3, and the eccentric static seat 26; "1", "1a", "1b", "1c", "1d", "1e" are disks with gear teeth tilting to the right and to the left, advantageously pack-assembled in order to make up the tenderizing roller 1, which intermeshes with gear disks "3", "3a", "3b", "3c", "3d", "3e" which are also advantageously pack-assembled in order to make up the tenderizing roller 3; 30 and 31 are contrarotating rollers provided with opposed tooth-like projections which intermesh without contact and with a substantially circular orientation in order to generate an undulated rolling gap 32 of adjustable width 33; 34 and 35 are tenderizing toothed rollers placed below the like rollers 1 and 3, in order to allow the presence of the second tenderizing unit with the aim of carrying out the tenderization process in two progressive and subsequent steps.

The working of the mechanical equipment of the present invention, which is pointed out in the figures of the annexed sheets, can be easily understood as it is extremely simple and, moreover, it is easy to build and implement and use.

The present mechanical equipment is set in an operating condition. Then, the value of the width of the operative gap 15 needed for the tenderizing flattening of the pieces of meat, or fish, to be processed is set. The regulating wheel 29 in its angular adjustment set by the operator establishes the value "e" which determines the exact interaxial distance of the gear rollers 1 and 3. In the meanwhile and at the same time the motor 21 and the motors (not shown) operating both the belt conveyors 5 and 10 and the preparatory unit 7 with rotary blades 8 are started up. A set of particularly stringy and fibrous blocks of meat, or fowl, or fish, which are mostly set aside for grinding for the production of ground meat or fish, or usually classified in the category of pieces or blocks of meat suitable for boiling, is withdrawn, by any known means, from a storage container. Incidentally, pieces of low-quality meat classified as poor and barely marketable for their low-quality characteristics resulting in poor digestibility and quality. Said blocks, or scraps of tendinous muscular tissue from the carcasses of slaughtered animals, or from fibrous fish, are forwarded according to the direction of the arrow 9 to the belt conveyor 5, which conveys them according to the direction of the arrow 11 to the feeding hopper of the preparatory unit 7. The circular cutting blades 8 shape the blocks, or the pieces of meat to be tenderized, substantially in slices of about the same thickness. Said pieces of meat shaped as slices, having preferably a thickness of a few centimeters, are let out of the preparatory unit 7 in order to be forwarded by the belt conveyor 10 to the hopper 16 according to arrows 12 and 2, and from the hopper 16 are automatically conveyed by fall under the pressing actions of contrarotating rollers 1 and 3 which intermesh without contact. The pieces of meat to be tenderized are subjected in the input area "15a", between the opposed tooth-like projections, to a holding pliers-like action with no backup, to be subsequently progressively forwarded to the central area 15, sliding along a gap of substantially almost constant width, advantageously preset by the operator, which, angularly acting on the regulating wheel 29 imposes and sets the value of the eccentric distance "e" (see FIG. 3). In the central area 15 the pieces of meat are preponderantly subjected to pressing and tightening along several transversal, axial and oblique directions, in this way subjecting them to localized, subsequent stretching with continuous and progressive thinning effects in order to obtain at the output area "15b" of the tooth gap thin sheets of firm flattened meat, which are perfectly tenderized in their structure mainly by means of sliding motions and detachments of their constituent fibers without any laceration or disruption. There follows their conveyance, by fall or by detachment under the action of the scraping blades 4, into the collection container 6, which, at given time intervals depending on a set reached accumulation, will be removed and manually or automatically replaced according to the arrow 14 by an empty wheeled container which will be in its turn filled up with perfectly tenderized sheets of meat with evident characteristics of higher nutritive quality and market value, equaling the softness of higher-quality pieces of fresh meat or fish. Incidentally, the best constant results of excellent tenderization on the various kinds of fresh meat, or fish, have been obtained by the applicants by means of the above illustrated original solution in association with a teeth outline of the sinusoidal type, advantageously modified in order to obtain the right intermesh between the tip 19 and the groove outline 20 of the tooth-like projections of rollers 1 and 3, to make the passage gap 15 in the area of interaction of the rollers 1 and 3, as constant as possible, with the aim of carrying out the tightening flattening of the meat to be processed through a passage with an evolution of the thickness which the applicants deem, after protracted experimentation, adequate to carry out the desired tenderizing function. The passage evolution and the substantially sinusoidal outline are graphically illustrated in the subsequent operative instants "A", "B" and "C" of FIG. 10.

Of course, the invention, proposed herein by means of an original solution, is not limited to the only embodiment of this mechanical equipment which has been described above by way of example; on the contrary it includes all the variations deriving from the same principle and which can be differentiated in various construction forms, and it is clear that all the technically equivalent solutions, particularly for the construction of the pressing, tightening and conveying means, fall within the scope of the present invention.

We claim:

1. A process for the tenderization of fresh meat from different animal species, including fish, advantageously of meat cut into pieces of previously arranged shape, substantially of flat shape and in particular of pieces of meat of evident toughness due to tough and stringy muscular structures, characterized in that it comprises the following steps:

placing said pieces under the pressing action of facing contrarotating rollers provided with opposed tooth-like projections which intermesh without contact so as to produce at the inlet a holding pliers-like action with no backup followed by a progressive pressing and stretching action, along an operative gap of continuously changing width, having at least one section where the gap has a substantially constant preset value;

pressing and tightening, in overlapping steps, along several transversal, axial and oblique directions, by means of the shape and orientation of the tooth-like projections of the toothed rollers facing in substantial frontal parallelism, the pieces of meat are which are in this way subjected to localized and subsequent stretching actions with continuous and progressive thinning effects in order to obtain at the outlet of the toothed gap, and, therefore, at the end of the action of the teeth, geometric shapes like thin sheets of firm flattened meat, which are tenderized in their structure by sliding motions and detachment of their constituent fibers without their disruption, with evident characteristics of both a higher nutritive quality and market value.

2. The process for the tenderization of fresh meat from different animal species according to claim 1, characterized in that it operates by means of outlines and dimensions of the teeth suitable for obtaining a dragging and stretching gap as uniform as possible and with a greater linear development and having operative pliers-like holding, pressing and tightening surfaces provided with a corrugation of preset value, depending on the type of meat being processed, as well as on the required degree of tenderness.

3. The process for the tenderization of fresh meat from different animal species according to claim 2, characterized in that it shows an operative tenderizing gap between the interacting and intermeshing teeth whose width is adjustable in its minimum value depending on the type and the degree of tenderization of the meat being processed, said width varying substantially in the value range between 0.5 and 10 millimeters.

4. The process for the tenderization of fresh meat from different animal species according to claim 1, characterized in that the piece of meat being processed is simultaneously stretched along several directions, tightening and pressing it in a geometric shape like a sufficiently thin sheet in order to carry out the tenderization in a synergic way, by means of tooth-like projections tilting as compared to the longitudinal generating lines of the interacting, intermeshing toothed rollers.

5. The process for the tenderization of fresh meat from different animal species according to claim 4, characterized in that it carries out the tenderization by means of tooth-like projections tilting alternatively in both directions, right and left, and alternatively approached with opposed inclinations, the one after the other, in order to make up the opposed, interacting rollers in the same way of multiple, pack-assembled gear disks with connecting joints, or cusp-like arrangement, between one gear disk and the following one with different tilting.

6. The process for the tenderization of fresh meat from different animal species according to claim 1, characterized in that it carries out the tenderization by means of circular tooth-like projections located on the facing contrarotating rollers which intermesh and interact without contact, in order to create an undulated gap for rolling the pieces of raw meat prepared for the tenderization.

7. The process for the tenderization of fresh meat from different animal species according to claim 1, characterized in that it carries out the tenderization in several progressive and subsequent steps by means of at least two pairs of facing gear rollers, placed the one after the other, with identical -or different by size and/or geometric shape tooth-like projections of the pairs of rollers, and substantially equal or advantageously differentiated operative gaps.

8. The process for the tenderization of fresh meat from different animal species according to claim 1, characterized in that it carries out the tenderization in several progressive and subsequent steps by means of at least three facing gear rollers, interacting and intermeshing without contact in order to operate with gaps substantially different in width and advantageously progressively narrowing as compared to the inlet conveyance of the pieces of meat to be tenderized.

9. A mechanical apparatus for tenderization of fresh meat, comprising:

a preparatory unit for the pieces of meat to be tenderized;

belt, or like-elements, conveyors for conveying the pieces of meat advantageously prepared to a tenderizing unit;

at least one tenderizing unit comprising at least two facing contrarotating rollers provided with interacting and intermeshing tooth-like projections the shape and orientation of said projections facing in substantial frontal parallelism along several transversal, axial, and oblique directions order to produce on the pieces of meat placed between them dragging, pressing and stretching actions in several directions, which will cause the sliding motions and the detachment of the muscular and connective fibers, but not their disruption;

an adjusting device for the interaxial distance of the contrarotating rollers in order to allow the intermeshing of the facing teeth, and the forming between them of an operative gap whose minimum width is adjustable in the range of values oscillating substantially between 0.5 and 10 millimeters;

a kinematic mechanism for operating in contrarotation the facing interacting toothed rollers which intermesh without contact;

cleaning elements for the rollers, placed right below the operative area of the rollers, in order to remove from the surface of the toothed outlines the residual meat material which may accidentally stick to them by adhesion;

a device, comprising a wheeled container for collecting the thinned, tenderized pieces of meat.

10. The mechanical apparatus according to claim 9, characterized in that the preparatory unit for the pieces of meat to be tenderized is a rotary cutter for cutting the blocks of meat to be tenderized in slices.

11. The mechanical apparatus according to claim 9, characterized in that the tenderizing unit is formed by facing contrarotating rollers provided with longitudinal teeth which extend along the generating lines of the rollers and which preferably present a high ratio between their height and their pitch, together with allowed high values of the pitch diameter of the rollers.

12. The mechanical apparatus according to claim 11, characterized in that the tenderizing unit is formed by facing contrarotating rollers provided with tilting teeth with a left helix, or a right helix with respect to the generating lines of the rollers.

13. The mechanical apparatus according to claim 11, characterized in that the tenderizing unit is formed by contrarotating rollers composed by multiple alternating sections of tilting teeth with a right helix and with a left helix, with circumference lines of joints advantageously connected substantially by circular arcs or cusps for the continuity of the subsequent sections of different tilting.

14. The mechanical apparatus according to claim 11, characterized in that the tenderizing unit is formed by facing contrarotating rollers provided with teeth, or with circular undulated grooves orthogonal to the axis of the rollers, or substantially tilted wish a left helix, or with a right helix as compared to the circumference line.

15. The mechanical apparatus according to claim 14, characterized in that the adjusting device of the interaxial distance of the contrarotating rollers is a kinematic mechanism preferably formed by a bearing shaft provided with eccentric static seats of bearing, or like mechanisms, which induce a motion parallel to the axis of one of the rollers with respect to the other by using a lever, or a regulating wheel, which can easily allow an exact and micrometric adjustment of the width of the gap between the opposed and interacting teeth of the rollers.

16. The mechanical apparatus according to claim 15, characterized in that the kinematic mechanism which operates the toothed rollers in contrarotation is preferably a gear or chain transmission, or a transmission by means of known homokinetic joints, which allow a perfect synchronization between the toothed rollers.

17. The mechanical apparatus according to claim 16, characterized in that the tenderizing unit is formed by contrarotating rollers with a truncated cone shape.

18. The mechanical apparatus according to claim 17, characterized in that the cleaning elements of the toothed rollers are preferably scraping blades, advantageously made of plastic and with a sharp edge, kept in contact with the rollers by an elastic force generated by springs with a contact pre-charge.

* * * * *